US012712404B2

(12) United States Patent
Boris et al.

(10) Patent No.: US 12,712,404 B2
(45) Date of Patent: Aug. 18, 2026

(54) STATOR FOR AN ELECTRICAL MACHINE, AND ELECTRICAL MACHINE

(71) Applicant: Valeo eAutomotive Germany GmbH, Erlangen (DE)

(72) Inventors: Dotz Boris, Bad Neustadt a.d.Saale (DE); Christian Finger-Albert, Bad Neustadt a.d.Saale (DE)

(73) Assignee: Valeo eAutomotive Germany GmbH, Erlangen (DE)

( * ) Notice: Subject to any disclaimer, the term of this patent is extended or adjusted under 35 U.S.C. 154(b) by 253 days.

(21) Appl. No.: 18/552,734

(22) PCT Filed: Mar. 30, 2022

(86) PCT No.: PCT/EP2022/058505
§ 371 (c)(1),
(2) Date: Sep. 27, 2023

(87) PCT Pub. No.: WO2022/207762
PCT Pub. Date: Oct. 6, 2022

(65) Prior Publication Data

US 2024/0154484 A1 May 9, 2024

(30) Foreign Application Priority Data

Mar. 30, 2021 (DE) ..................... 10 2021 203 212.5

(51) Int. Cl.
*H02K 3/28* (2006.01)
*H02K 1/16* (2006.01)
(Continued)

(52) U.S. Cl.
CPC ................. *H02K 3/28* (2013.01); *H02K 1/16* (2013.01); *H02K 2203/09* (2013.01)

(58) Field of Classification Search
CPC .. H02K 3/04; H02K 3/12; H02K 3/28; H02K 3/32; H02K 3/46; H02K 3/50; H02K 2203/09
See application file for complete search history.

(56) References Cited

U.S. PATENT DOCUMENTS 10,097,057 B2 * 10/2018 Kessler .................... H02K 3/46
10,250,096 B2 * 4/2019 Nishikawa ............... H02K 3/50
(Continued)

FOREIGN PATENT DOCUMENTS

CN 110417151 A * 11/2019 ............... H02K 3/28
CN 110971021 A 4/2020
(Continued)

OTHER PUBLICATIONS

International Search Report mailed on Aug. 17, 2022 in PCT/EP2022/058505 filed on Mar. 30, 2022 (2 pages).

*Primary Examiner* — Edgardo San Martin
(74) *Attorney, Agent, or Firm* — Oblon, McClelland, Maier & Neustadt, L.L.P.

(57) ABSTRACT

Stator for an electric machine, having a stator core with a first end face and a second end face and a stator winding, which has multiple part windings and forms a number of phase elements. Each part winding has multiple shaped conductors, which extend through the stator core along an axial direction at predetermined angular positions in the circumferential direction, a first end portion, which comprises a free end of the part winding and protrudes from the stator core at the first end face, and a second end portion. The first end portion protrudes from the stator core at one of the predetermined angular positions and extends in the axial direction at the predetermined angular position.

17 Claims, 11 Drawing Sheets

(51) Int. Cl.
*H02K 3/04* (2006.01)
*H02K 3/50* (2006.01)

(56) References Cited

U.S. PATENT DOCUMENTS

| | | | | |
|---|---|---|---|---|
| 10,476,338 | B2 * | 11/2019 | Tanaka | H02K 3/28 |
| 11,088,588 | B2 * | 8/2021 | Ogawa | H02K 3/50 |
| 11,114,913 | B2 * | 9/2021 | Hino | H02K 3/28 |
| 11,539,259 | B2 * | 12/2022 | Wieprecht | H02K 3/522 |
| 11,621,618 | B2 * | 4/2023 | Miyazaki | H02K 3/12<br>310/198 |
| 12,027,933 | B2 * | 7/2024 | Ishikawa | H02K 11/25 |
| 12,046,972 | B2 * | 7/2024 | Ishikawa | H02K 3/28 |
| 12,191,729 | B2 * | 1/2025 | Dotz | H02K 15/064 |
| 12,212,200 | B2 * | 1/2025 | Ishikawa | H02K 3/14 |
| 2017/0346369 | A1 | 11/2017 | Tanaka | |
| 2019/0319419 | A1 | 10/2019 | Wang et al. | |
| 2019/0319508 | A1 | 10/2019 | Chang et al. | |
| 2019/0319519 | A1 | 10/2019 | Wang et al. | |
| 2019/0363620 | A1 | 11/2019 | Wang et al. | |
| 2020/0274425 | A1 | 8/2020 | Miyazaki et al. | |
| 2023/0134155 | A1 * | 5/2023 | Kumagai | H02K 3/50<br>310/52 |
| 2023/0208237 | A1 * | 6/2023 | Gopalakrishnan | H02K 3/50<br>310/71 |
| 2023/0246506 | A1 * | 8/2023 | Siegert | H02K 3/50<br>310/71 |
| 2023/0378843 | A1 * | 11/2023 | Ruppert | H02K 3/50 |
| 2024/0055926 | A1 * | 2/2024 | Kalisz | H02K 3/50 |
| 2024/0333061 | A1 * | 10/2024 | Kalisz | H02K 3/28 |
| 2025/0038606 | A1 * | 1/2025 | Tateno | H02K 3/28 |
| 2025/0088060 | A1 * | 3/2025 | Jadhav | H02K 3/50 |

FOREIGN PATENT DOCUMENTS

| | | | | | |
|---|---|---|---|---|---|
| CN | 109586464 | B | * | 11/2021 | H02K 1/16 |
| CN | 117595551 | A | * | 2/2024 | H02K 3/50 |
| CN | 119341252 | A | * | 1/2025 | H02K 1/12 |
| CN | 120454368 | A | * | 8/2025 | |
| DE | 102017105483 | A1 | * | 9/2017 | H02K 3/12 |
| EP | 4300780 | A1 | * | 1/2024 | H02K 3/28 |
| EP | 4300784 | A1 | * | 1/2024 | H02K 3/50 |
| WO | WO-2022247273 | A1 | * | 12/2022 | H02K 3/28 |
| WO | WO-2023163089 | A1 | * | 8/2023 | H02K 3/28 |

* cited by examiner 35b
34b
34a
3
2
23a
11a
11b
8b
18
12b
14b
35a
23b
11c
34c
11d
35a
31

STATOR FOR AN ELECTRICAL MACHINE, AND ELECTRICAL MACHINE

BACKGROUND OF THE INVENTION

Field of the Invention

The present invention relates to a stator for an electric machine, having a stator core with a first end face and a second end face and having a stator winding, which has multiple part windings and forms a number of phase elements, wherein each part winding has multiple shaped conductors, which extend through the stator core along an axial direction at predetermined angular positions in the circumferential direction, a first end portion, which comprises a free end of the part winding and protrudes from the stator core at the first end face, and a second end portion.

In addition, the invention relates to an electric machine for driving a vehicle.

Description of the Related Art

DE 10 2017 105 483 A1 discloses a stator for a rotating electric machine, wherein the stator has: an annular stator core and a multi-phase stator coil, which is composed of a plurality of phase windings. The stator coil has at least two conducting wires and a connection. Each of the conducting wires is connected to one of the phase windings of the stator coil.

In such a stator, end portions for connecting the part windings are designed with multiple geometrical bends. This complicates the manufacture of the stator and hinders the connection.

BRIEF SUMMARY OF THE INVENTION

The invention is based on the object of specifying an option for simple connection of the part windings of the stator winding.

In a stator of the type mentioned at the outset, this object is achieved according to the invention in that the first end portion protrudes from the stator core at one of the predetermined angular positions and extends in the axial direction at the predetermined angular position.

The stator according to the invention for an electric machine has a stator core. The stator core has a first end face a second end face. The stator furthermore has a stator winding. The stator winding has multiple part windings and forms a number of phase elements. Each part winding has multiple shaped conductors. The shaped conductors extend through the stator core along an axial direction at predetermined angular positions in the circumferential direction. Each part winding furthermore has a first end portion. The first end portion comprises a free end of the part winding. The first end portion protrudes from the stator core. Each part winding furthermore has a second end portion. The first end portion protrudes from the stator core at one of the predetermined angular positions. The first end portion extends in the axial direction at the predetermined angular position.

The invention is based on the consideration of routing the first end portion axially out of the stator core at the predetermined angular position at which the shaped conductor also extends inside the stator core. The end portion may then be connected at the predetermined angular position. This simplifies the manufacture of the stator winding and the connection quite considerably since it is possible to dispense with complicated multiple bends in the circumferential direction. As a result of the direct routing of the first end portion in the axial direction, its length is moreover reduced which also advantageously reduces the ohmic losses of the stator winding.

The second end portion of a respective part winding advantageously comprises a free end of the part winding and protrudes from the stator core at the first end face or the second end face. Provision is preferably made here for the second end portion of a respective part winding to protrude from the stator core at one of the predetermined angular positions at the end face and to extend in the axial direction at the angular position. The second end portions may thus be routed out of the stator core analogously to the first end portions so that the connection and the manufacture of the stator winding are also simplified in respect of the second end portions.

In a preferred configuration, the stator according to the invention has multiple connectors, which connect the shaped conductors at the end faces and, at the first end face, form an end winding which extends inside a radial region.

A respective part winding is, in particular, formed by a plurality of shaped conductors connected in series by the connectors. The first and the second end portion of a respective part winding preferably form two ends of the series connection. The radial region is an annular area which adjoins the stator core and is occupied by the end winding.

In a preferred development, provision may be made for the first end portion of a respective part winding to proceed away from the radial region so that the first end portion extends along the end winding. The end portion may therefore be routed along the end winding in close proximity thereto in a space saving manner. Alternatively or additionally, the second end portion of a respective winding may proceed away from the radial region so that the second end portion extends along the end winding. The second end portion may therefore be routed analogously to the first end portion.

The first end portion and/or the second end portion preferably do not extend along the circumferential direction, or extend exclusively along the axial direction and the radial direction, between the stator core and the free end.

The second end portion preferably assumes a larger radial spacing from the end winding than the first end portion. The end portions may thus extend along two concentric circles about a longitudinal axis of the stator core so as to form connection options at the different radial positions.

Provision may preferably furthermore be made for the first end portion and/or the second end portion to be integrally connected to a respective shaped conductor and to be formed at the respective predetermined angular position with a parallel offset in the radial direction with respect to the shaped conductor. To this end, the end portion may have a first bend, which is provided at the radial positions of the shaped conductor and points away from the radial region. Furthermore, the end portion may have a second bend, which is spaced axially further away from the stator core and points towards the radial region so that the end portion beyond the second bend extends with a parallel offset with respect to the shaped conductor. Between the first bend and the second bend, the end portion proceeds preferably linearly in a radial direction and in the axial direction. Beyond the second bend, the end portion preferably proceeds along the axial direction. Between the stator core and the first bend, the end portion may proceed exclusively along the axial direction at the predetermined angular position.

In the stator according to the invention; provision may advantageously furthermore be made for a respective part winding to have a terminal and a star-point terminal. The first end portion may form the terminal here and the second end portion may form the star-point terminal. Alternatively, the first end portion may form the star-point terminal and the second end portion may form the terminal.

In a development, provision may be made for some of the part windings to form one arrangement and for those end portions of the part windings of the arrangement which form the star-point terminal to extend along the end winding on one radial side of the radial region. Moreover, provision may be made for some of the part windings to form a second arrangement and for those end portions of the part windings of the second arrangement which form the star-point terminal to extend along the end winding on the other radial side of the radial region. This enables, in particular, a configuration of the stator winding with two star points, wherein the star-point terminals are arranged on different sides of the radial region.

The or a respective arrangement may furthermore have a star-point connection, via which those end portions of the arrangement which form the star-point terminal are interconnected. The star-point connection is preferably located radially on the end portions. The star-point connection may be secured to the end portions, in particular in a materially bonded manner.

The star-point connection is preferably formed as a curved busbar. Such a star-point connection can be manufactured in a simple manner and may be arranged at the star-point terminals in a space-saving manner.

Provision may moreover be made for a plurality of slots, which are arranged in the circumferential direction and in which the shaped conductors are received, to be formed in the stator core. The slots pass, in particular, completely through the stator core from the first end face to the second end face. The shaped conductors may extend completely through the slots. The slots are preferably formed in the stator core such that they are distributed over a circumferential direction.

Those end portions of the part windings of a respective phase element which form the terminal preferably protrude from the same slot or from multiple immediately adjacent slots. The end portions in particular protrude from multiple immediately adjacent slots if the stator has a hole count of greater than or equal to two. The hole count here corresponds to the number of slots per pole and phase.

Provision may furthermore be made for the shaped conductors to be received in a predetermined number of radially arranged layers of a respective slot in the stator core. Those end portions of the part windings of a respective phase element which form the terminal may adjoin shaped conductors which are arranged in a radially innermost one of the layers and/or in a radially outermost one of the layers. This simplifies the routing of the end portions along the radial region considerably.

The stator preferably furthermore has a terminal arrangement, which has a number of terminal elements which corresponds to the number of phase elements. In a development, provision may be made for a respective terminal element to interconnect those end portions of the part windings of one of the phase elements which form the terminal.

The stator may furthermore have an insulation device, which is designed for electrical insulation of the end winding with respect to the terminal elements.

The insulation device preferably has a plate-shaped body. The body may have a first side, which extends at least partly over an axial end of the end winding in the circumferential direction. The body may furthermore have a second side, which is arranged opposite the first side and on which the terminal elements are arranged. The body preferably furthermore has at least one cutout, which extends from the first side to the second side and through which the terminals are routed from the first side and are electrically conductively connected to one of the terminal elements on the second side. In a preferred configuration, the insulation device furthermore comprises an insulation arrangement, which has a first portion, which extends from the first side of the body in a direction pointing away from the second side and surrounds the end winding along its circumference on one of two radial sides of the end winding.

As a result of the insulation arrangement, with its first portion, the insulation device enables the end winding to be electrically insulated with respect to further objects which are arranged on the radial side of the end winding. Installation space is saved as a result of the object not having to be arranged at the axial end of the end winding. Therefore, greater degrees of freedom with regard to the configuration of a stator having the stator winding are achieved, since the object arranged on the radial side may be arranged in close proximity to the radial side of the end winding due to the insulation effect imparted by the first portion. The first portion of the insulation arrangement ensures sufficiently large air gaps and creepage paths between the end winding and the object, as it were.

In a preferred configuration, the radial side is the radially inner side of the two sides of the end winding. The insulation device is preferably made of an electrically insulating plastic. The body is preferably formed to be flat on the first side and/or on the second side.

In a preferred configuration of the insulation device, provision is made for the insulation arrangement to have a second portion, which extends from the first side of the body in the direction pointing away from the second side and which surrounds the star-point connection arranged on the radial side of the end winding on its side remote from the end winding so that the first portion and the second portion surround the star-point connection on both sides. As a result of the first and the second portion of the insulation arrangement, the star-point connection may be electrically insulated on both sides and therefore arranged in a space-saving manner on the radial side of the end winding. It is thus possible, in particular, to dispense with an arrangement of the first star-point connection beyond the axial end of the end winding, which increases the axial extent of the stator, and to save on installation space.

In the insulation device according to the invention, provision may furthermore be made for the insulation arrangement to have a third portion, which extends from the first side of the body, in particularly concentrically to the first portion, in the direction pointing away from the second side and is designed to surround the end winding along its circumference on the radial side or on the other of the radial sides of the end winding. As a result of the third portion, a further object may be arranged analogously to the first object on the other radial side of the end winding such that it is electrically insulated with respect thereto.

In an advantageous configuration, provision is furthermore made for the insulation arrangement to have a fourth portion, which extends from the first side of the body in the direction pointing away from the second side of the body and surrounds the star-point connection arranged on the radial side of the end winding on its side remote from the end winding so that the third portion and the fourth portion surround the star-point connection on both sides. As a result of the third and the fourth portion of the insulation arrangement, the star-point connection may be electrically insulated on both sides and it is possible to save on corresponding installation space.

In addition, the insulation arrangement may have a fifth portion, which extends from the first side of the body in the direction pointing away from the second side of the body and extends together with the first portion along an arc and surrounds the end winding. Alternatively or additionally, the insulation arrangement may have a sixth portion, which extends from the first side of the body in the direction pointing away from the second side of the body and extends together with the third portion along an arc and surrounds the end winding. The fifth portion and the sixth portion serve for mechanical stabilization of the arrangement of the insulation device on the end winding.

A respective portion of the insulation arrangement preferably has the form of a linear cylinder with an approximately C-shaped base area, in particular a base area in the shape of a circular-ring sector. A lateral surface of the linear cylinder here in particular faces the end winding. A base area of the linear cylinder here is located on the body such that the linear cylinder projects from the body. In an exemplary embodiment, the body and the portions create one or more U profiles or a multi-U profile.

The first side of the body preferably extends from a first end of the body to a second end of the body in order to extend from the first end to the second end along the axial end of the end winding in the circumferential direction of the end winding. In particular, the body extends over a maximum of 75%, preferably over a maximum of 60%, particularly preferably over a maximum of 50%, of the circumferential direction of the end winding.

The first portion of the insulation arrangement here may be provided at the first end of the body. Alternatively or additionally, the second portion of the insulation arrangement may be provided at the first end of the body. Alternatively or additionally, the third portion of the insulation arrangement may be provided at the second end of the body. Alternatively or additionally, the fifth portion of the insulation arrangement may be provided at the second end. Alternatively or additionally, the sixth portion of the insulation arrangement may be provided at the first end.

Provision may furthermore be made for the body to have multiple through openings passing through the first side and the second side. Often, a stator, after being mounted together with the insulation device, is encapsulated or coated with a free-flowing material, for example through immersion in an immersion bath. The through opening here enables the free-flowing material to penetrate more easily into the regions of the end winding which are covered by the body during the immersion procedure. Furthermore, the through opening also enables the free-flowing material to run off more easily after the immersion procedure so as to avoid massive accumulations of the material between the insulation device and the end winding. By avoiding such accumulations, more robust operation of the stator or the electric machine having the stator is possible.

The through openings may be arranged at points at which two of the portions of the insulation arrangement proceed concentrically to each other.

The through openings may furthermore be arranged at points at which the first portion and the second portion of the insulation arrangement proceed concentrically to each other, and/or a point at which the third portion and the fourth portion of the insulation arrangement proceed concentrically to each other. Since the second side of the body and the concentrically proceeding portions delimit a clearance in which the free-flowing material may only enter with difficulty, particularly good wetting of the object received in the clearance, in particular the star-point connection, may be enabled via the through opening. The through openings may furthermore be arranged at points at which the fifth portion and the third portion and/or the sixth portion and the first portion proceed concentrically to each other.

The through openings may furthermore be arranged at points which are located centrally between respective groups of four of the cutouts, of which a first cutout and a second cutout are located at a first radial position, a third cutout and a fourth cutout are located at a second radial position, the first cutout and the third cutout are located at a first position in the circumferential direction and the second and the fourth cutout are located at a second position in the circumferential direction.

In an advantageous configuration, the body of the insulation device has a curved, in particular arcuate, progression. A respective portion of the insulation arrangement here may extend in the axial direction and in the circumferential direction.

In the insulation device, provision is preferably made for at least some of the cutouts to be arranged on a first arc, which proceeds concentrically to the first portion of the insulation arrangement. Those terminals of the stator winding which protrude from the stator core at different radial positions of the stator may thus be routed out through the cutout.

Provision may furthermore be made for some of the cutouts to be arranged on a second arc, which proceeds concentrically to, and at a spacing from, the first arc. This enables terminals arranged at two different radial positions to be routed through the cutout. In particular, two cutouts are situated at at least one angular position of the arcs in each case. This enables terminals of the same phase element which are arranged on the radially inner side and the radially outer side to be electrically connected at the angular position by a terminal element. In a particularly preferred configuration, two cutouts located on both arcs are provided at three different angular positions of the arcs in each case.

Moreover, in the insulation device, provision may be made for a respective cutout to have an edge with a projection directed into the cutout. As a result of the projection, it is possible to fix the position of multiple end portions routed through a cutout.

In a preferred configuration of the insulation device, provision is made for a receiving space to be formed for a respective terminal element on the second side of the body, which receiving space is designed to inhibit a movement of the terminal element relative to the second side when it is received in the receiving space. In particular, the receiving space has one or more projections for inhibiting a rotational movement of the terminal element about an axis of rotation positioned perpendicular to the second side. Alternatively or additionally, the receiving space has a projection for inhibiting a translatory movement of the terminal element along the second side. The terminal element may therefore be securely positioned on the second side of the body.

Moreover, provision may be made for the body to have a further cutout, in which a sensor of the stator, which is arranged on the end winding, may be received. The sensor, for example a temperature sensor for determining a temperature of the end winding, may thus be securely positioned. In a preferred development, a projection for guiding the sensor is formed along an edge contour of the cutout on the second side. The projection enables the sensor to be additionally supported.

In the stator according to the invention, it is furthermore preferred for one of the end portions, in particular the end portion forming the terminal, of a respective part winding to be longer in the axial direction than the other of the end portions of the respective part winding. The star-point connections and the terminals for the phase elements may thus be arranged in different axial planes, for example.

The object on which the invention is based is furthermore achieved by an electric machine for driving a vehicle, having a stator according to the invention and a rotor, which is rotatably supported inside the stator.

The electric machine according to the invention is preferably designed to drive a vehicle. In this regard, it may be designed to form part of a drive train of the vehicle. The electric machine is preferably designed as an, in particular permanently excited, synchronous machine. Alternatively, the electric machine may be designed as an asynchronous machine.

The object on which the invention is based is furthermore achieved by a vehicle having an electric machine according to the invention, which is designed to drive the vehicle. The vehicle may be a battery electric vehicle and/or a hybrid vehicle.

In an exemplary embodiment, in particular two first end portions of a phase element, which protrude at the same end face of the stator, may be arranged at an inner and an outer radial position of the same angular position in each case. The end portions may therefore be easily connected in the radial direction. They may form a terminal pair.

In an exemplary embodiment, in particular two first end portions of a phase element, which protrude at the same end face of the stator, may be arranged at an innermost and an outermost radial position of the same angular position in each case. The end portions may therefore be easily connected in the radial direction. They may form a terminal pair.

In a further exemplary embodiment, two further first end portions may be arranged adjacent to the two first end portions. Therefore, two such terminal pairs may be arranged adjacently and connected to form a common terminal. Therefore, for example, four part windings, which form a phase element, may be easily connected, for example, to an inverter.

BRIEF DESCRIPTION OF THE SEVERAL VIEWS OF THE DRAWINGS

Further advantages and details of the present invention can be found in the exemplary embodiments described below and on the basis of the drawings. These drawings are schematic illustrations, in which.

DETAILED DESCRIPTION OF THE INVENTION

Figure 1:
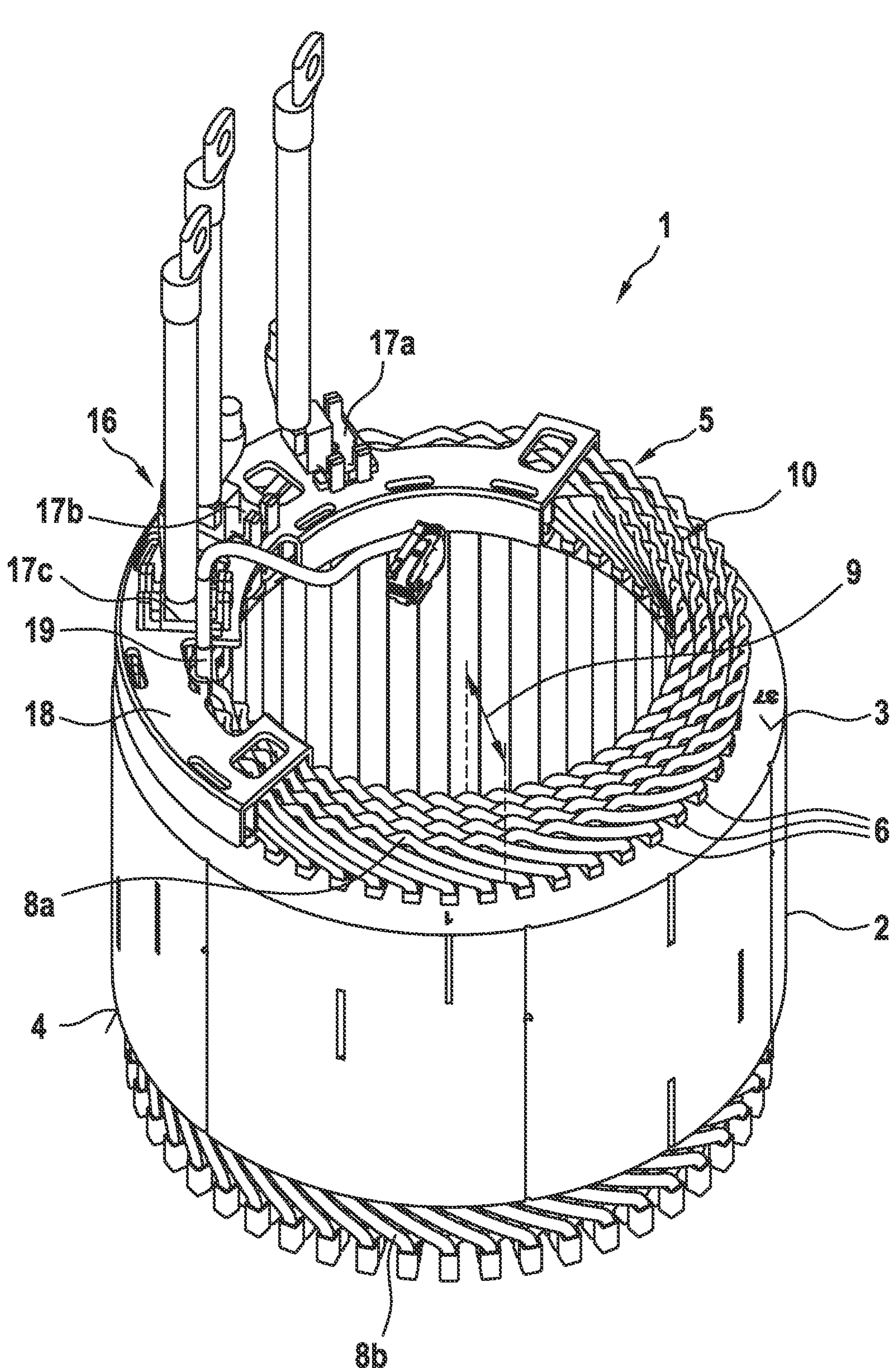
FIG. 1 shows a perspective view of an exemplary embodiment of the stator according to the invention.

FIG. 1 is a perspective view of an exemplary embodiment of a stator 1.

The stator has a stator core 2 with a first end face 3 and a second end face 4 and a stator winding 5.

Figure 2:
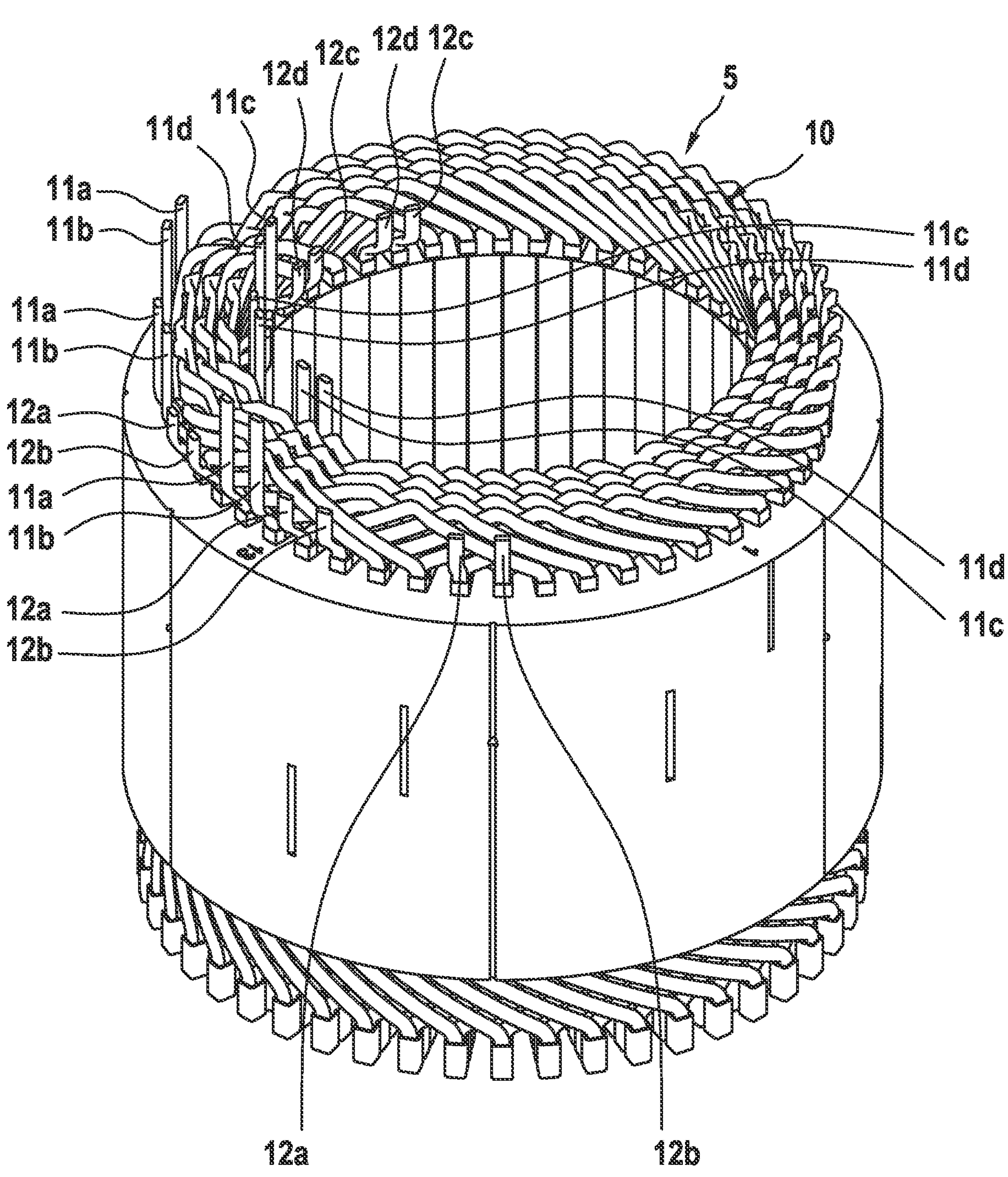
FIG. 2 shows a perspective illustration of the stator core and the stator winding.
Figure 3:
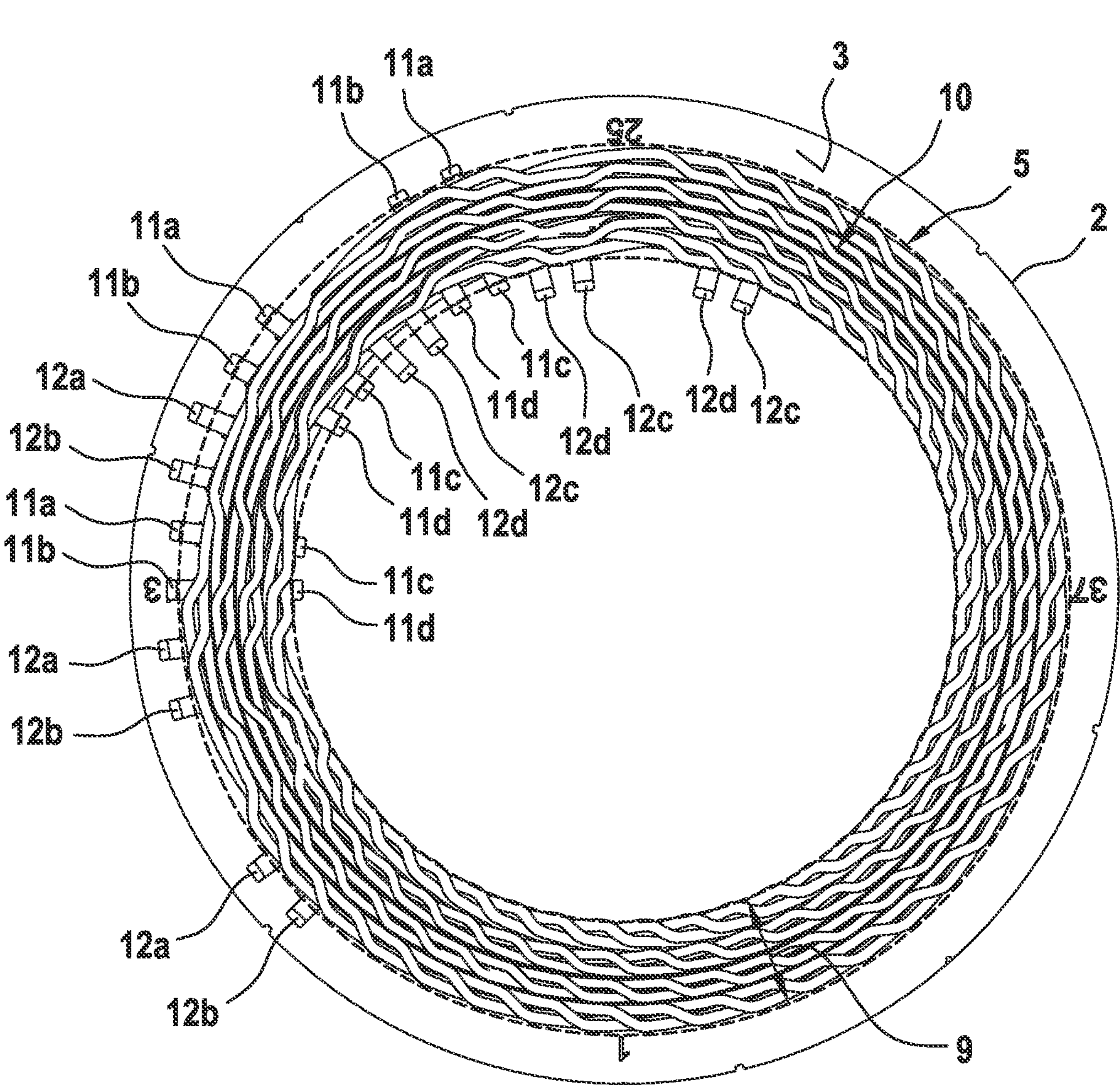
FIG. 3 shows a plan view of the stator core and the stator winding.
Figure 4:
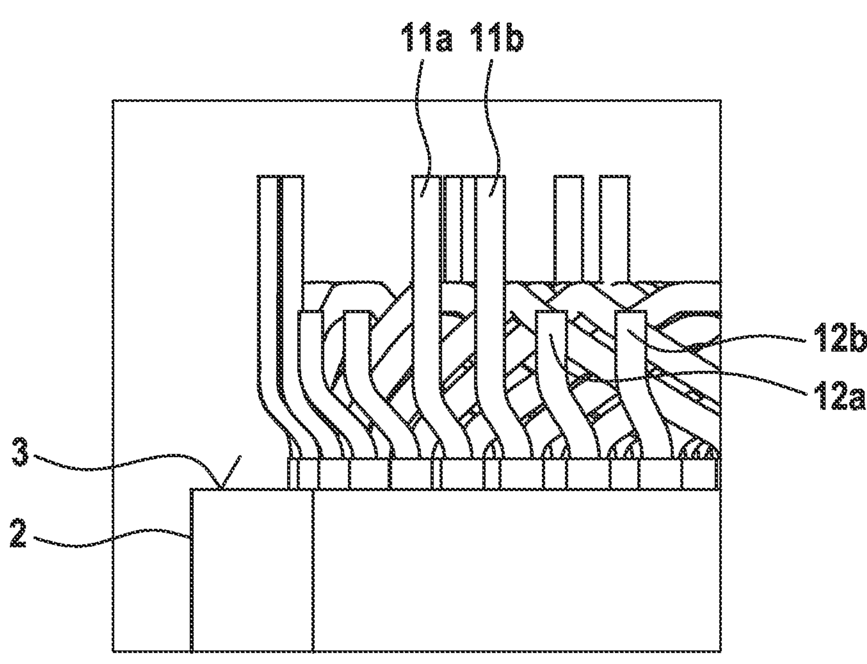
FIG. 4 shows a detailed side view of the stator core and the stator winding.
Figure 5:
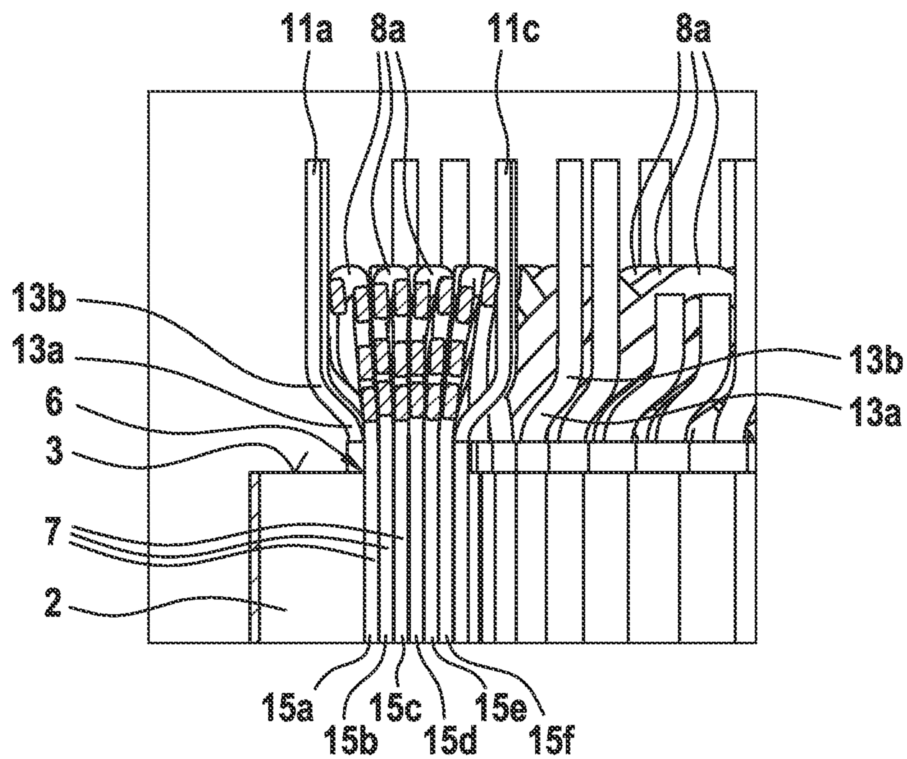
FIG. 5 shows a detailed sectional view of the stator core and the stator winding.

FIG. 2 to FIG. 5 show the stator core 2 and the stator winding 5, wherein FIG. 2 is a perspective illustration, FIG. 3 is a plan view, FIG. 4 is a detailed side view and FIG. 5 is a detailed sectional view.

The stator core 2 is formed, by way of example, from a laminated core with a plurality of axially layered individual laminations. In the axial direction, a plurality of slots 6—by way of example, 48 slots in the present case—pass through the stator core 2, which slots are arranged in succession in the circumferential direction of the stator 1.

The stator winding 5 has multiple part windings and forms a predetermined number of phase elements—by way of example, three phase elements in the present case. Each part winding comprises multiple shaped conductors 7 (see FIG. 5), which extend through the stator core 2 along an axial direction at predetermined angular positions in the circumferential direction, and multiple connectors 8*a*, 8*b*, which connect the shaped conductors 7 at the end faces 3, 4 and form an end winding 10, extending inside a radial region 9 (see FIG. 3), at the first end face 3.

Each part winding furthermore has a first end portion 11*a*, 11*b*, 11*c*, 11*d*, which comprises a free end of the part winding, protrudes from the stator core 2 at the first end face 3, and proceeds away from the radial region 9 so that the first end portion 11*a* to 11*d* extends along the end winding 10. The first end portion 11*a* to 11 *d* here extends out of the stator core 2 at one of the predetermined angular positions and in the axial direction at the predetermined angular position.

Each part winding furthermore has a second end portion 12*a*, 12*b*, 12*c*, 12*d*, which comprises a free end of the part winding, protrudes from the stator core 2 at the first end face 3, and proceeds away from the radial region so that the second end portion 12*a* to 12*d* extends along the end winding 10. The second end portion 12*a* to 12*d* here extends out of the stator core 2 at one of the predetermined angular positions and in the axial direction at the predetermined angular position.

In the present exemplary embodiment, by way of example, twelve part windings are provided. Four part windings form a respective phase element here. The first end portions 11*a* to 11*d* of a respective part winding form a terminal of the part winding, which can be connected, for example, to an inverter. The second end portion 12a to 12d forms a star-point terminal of the part winding.

The first end portions 11a, 11 b and the second end portions 12a, 12b extend along the end winding 10 or the radial region 9 on the radially outer side here. The first end portions 11c, 11d and the second end portions 12c, 12d extend along the end winding 10 or the radial region 9 on the radially inner side. In the present exemplary embodiment, the second end portions 12a to 12d assume a greater radial spacing from the end winding 10 than the first end portions 11a to 11d.

As revealed in detail in FIG. 4 and FIG. 5, each end portion 11a to 11d, 12a to 12d has a first bend 13a, provided at the radial positions of the shaped conductor and pointing away from the radial region 9, and a second bend 13b, which is spaced axially further away from the stator core 2 and points towards the radial region 9. The end portion 11a to 11d, 12a to 12d beyond the second bend 13b thus extends with a parallel offset with respect to the shaped conductor 7. Between the first bend 13a and the second bend 13b, the end portion 11a to 11d, 12a to 12d proceeds linearly in a radial direction and in the axial direction. Beyond the second bend 13b, the end portion 11a to 11d, 12a to 12d proceeds along the axial direction. Between the stator core 2 and the first bend 13a, the end portion 11a to 11d, 12a to 12d proceeds exclusively along the axial direction at the predetermined angular position.

In a first arrangement of part windings, which comprises three of the part windings in the present case, the second end portions 12a, 12b forming the star-point terminal extend along the end winding 10 on the radially outer side of the radial region 9. In a second arrangement of part windings, which comprises the three other part windings in the present case, the second end portions 12c, 12d forming the star-point terminal extend along the end winding 10 on the radially outer side of the radial region 9.

Figure 6:
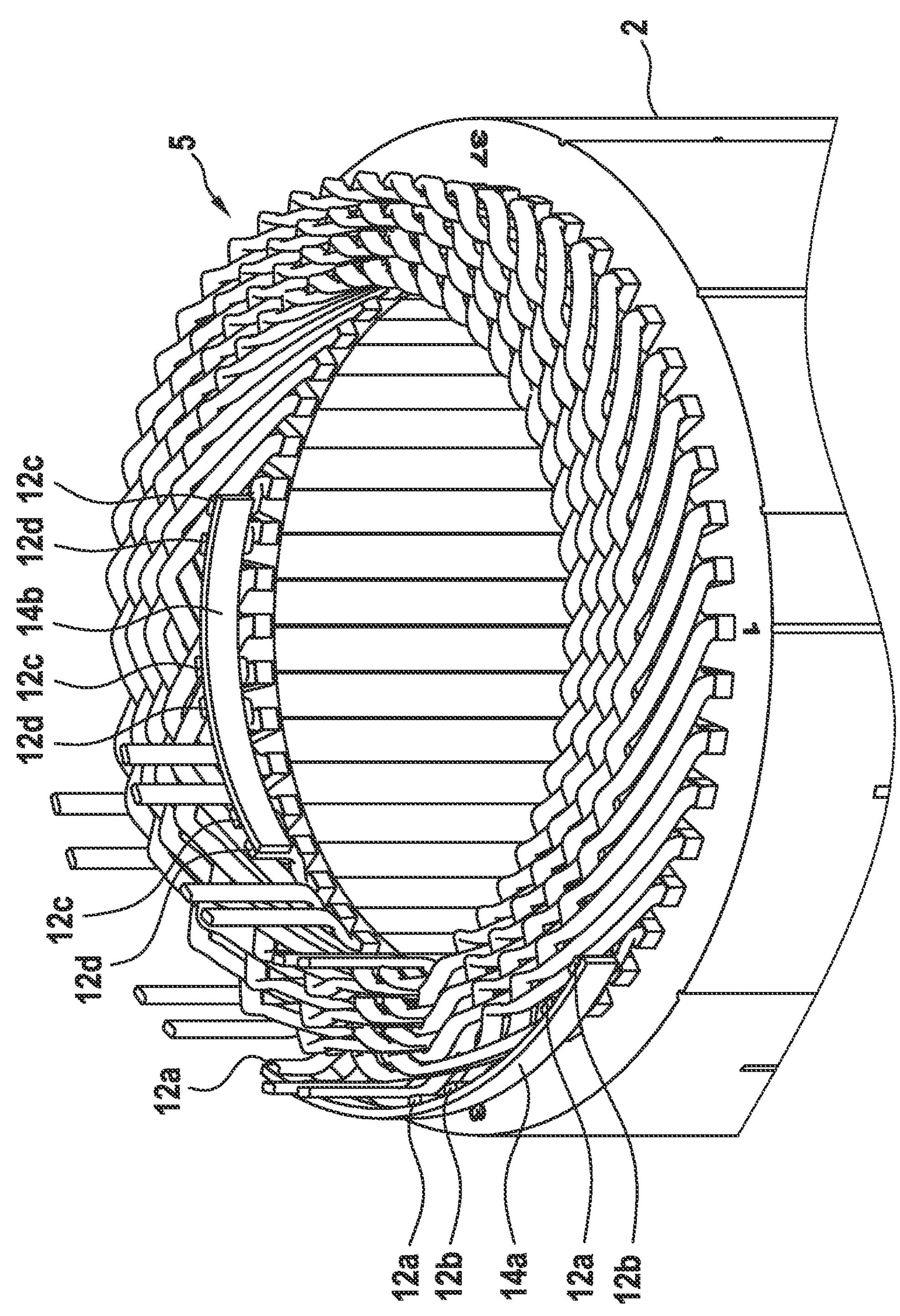
FIG. 6 shows a detailed perspective view of the stator core with the stator winding and two star-point connections.
Figure 7:
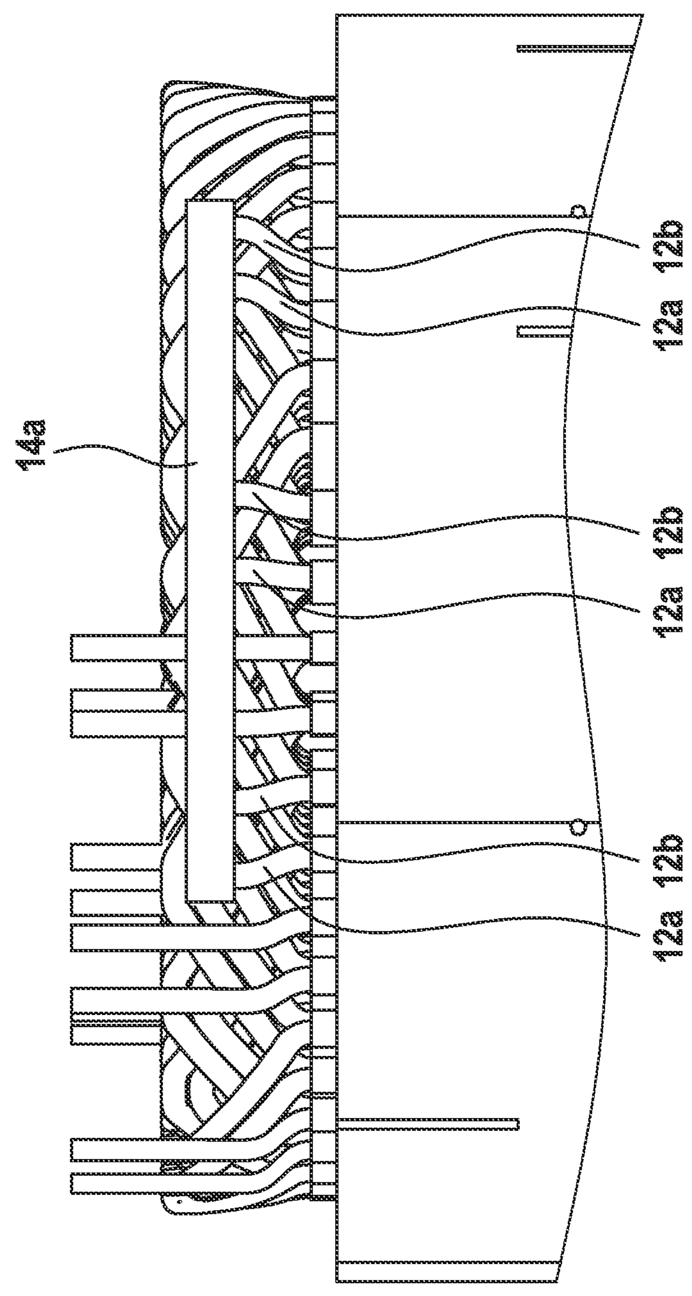
FIG. 7 shows a detailed side view of the stator core and the stator winding with one of the star-point connections.
Figure 8:
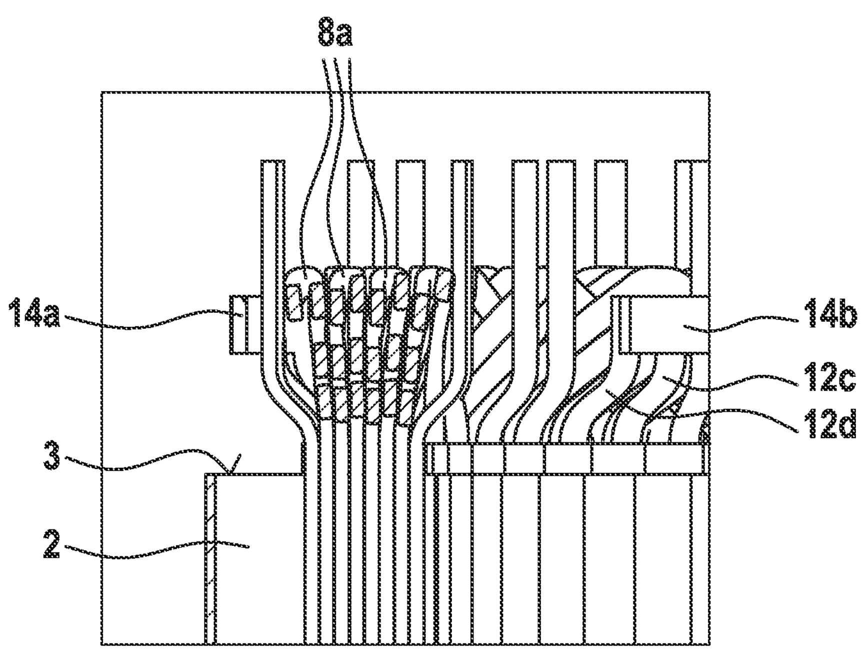
FIG. 8 shows a detailed sectional view of the stator core with the stator winding and the star-point connections.

FIG. 6 to FIG. 8 show the stator core 2, the stator winding 5 and two star-point terminals 14a, 14b of the stator 1, wherein FIG. 6 is a detailed perspective view, FIG. 7 is a detailed side view and FIG. 8 is a detailed sectional view.

A star-point connection 14a, 14b is provided for each of the two arrangements so that the stator 1 has two star points. Each star-point connection 14a, 14b connects the second end portions 12a to 12d of one of the arrangements. The first star-point connection 14a here connects the second end portions 12a, 12b of the first arrangement which extend along the end winding 10 on the radially outer side of the radial region 9. The second star-point connection 14b connects the second end portions 12b, 12c, 12d of the second arrangement which extend along the end winding 10 on the radially inner side of the radial region 9.

In the present exemplary embodiment, each star-point connection 14a, 14b is formed by a curved bulbar. The star-point connection 14a, 14b is radially mounted on the second end portions 12a to 12d which are connected thereby and is fastened to these second end portions in a materially bonded manner, for example by welding.

It is furthermore shown in FIG. 1 to FIG. 5 that the terminal-forming first end portions 11a to 11d of the part windings forming a respective phase element are arranged in multiple—in this case two—immediately adjacent slots 6. FIG. 5 shows that the shaped conductors 7 are received in multiple radial layers—by way of example, six radial layers 15a, 15b, 15c, 15de, 15e, 15f here—of a respective slot 6. The first end portions 11a, 11b here adjoin the shaped conductors 7 arranged in the radially outermost layer 15a and the first end portions 11c, 11d adjoin the shaped conductors 7 arranged in the radially innermost layer 15f. As can be seen particularly clearly in FIG. 3, the four terminals for a respective phase element are therefore arranged at two radial positions and two angular position in the circumferential direction.

FIG. 1 furthermore shows a terminal arrangement 16 of the stator 1, which has a number of terminal elements 17a, 17b, 17c which corresponds to the number of phase elements. A respective terminal element 17a, 17b, 17c interconnects those first end portions 11a to 11d of the part windings of one of the phase elements which form the terminal. Each terminal element 17a, 17b, 17c is integrally formed and contacts all first end portions 11a to 11d of the part windings of the phase element.

In FIG. 1, FIG. 5 and FIG. 8, it can furthermore be seen that the shaped conductors 7 are formed from bent metal rods, preferably of copper. The shaped conductors 7 extend from the first end face 3 to the second end face 4 inside the slots 6. Such a stator winding may also be referred to as a hair pin winding. The end portions 11a to 11 d, 12a to 12d are integrally formed with a respective shaped conductor 7 of a part winding. The other shaped conductors 7 of the part windings are connected in pairs at the first end face 3 by the connectors 8a which are integrally formed therewith. At the second end face 4, pairs of shaped conductors 7 which are not connected at the first end face 3 by the connectors 8a are connected by connectors 8b.

In FIG. 1, an insulation device 18 of the stator 1 is furthermore shown, which is designed for electrical insulation of the end winding 10 with respect to the terminal elements 17a, 17b, 17c.

Figure 9:
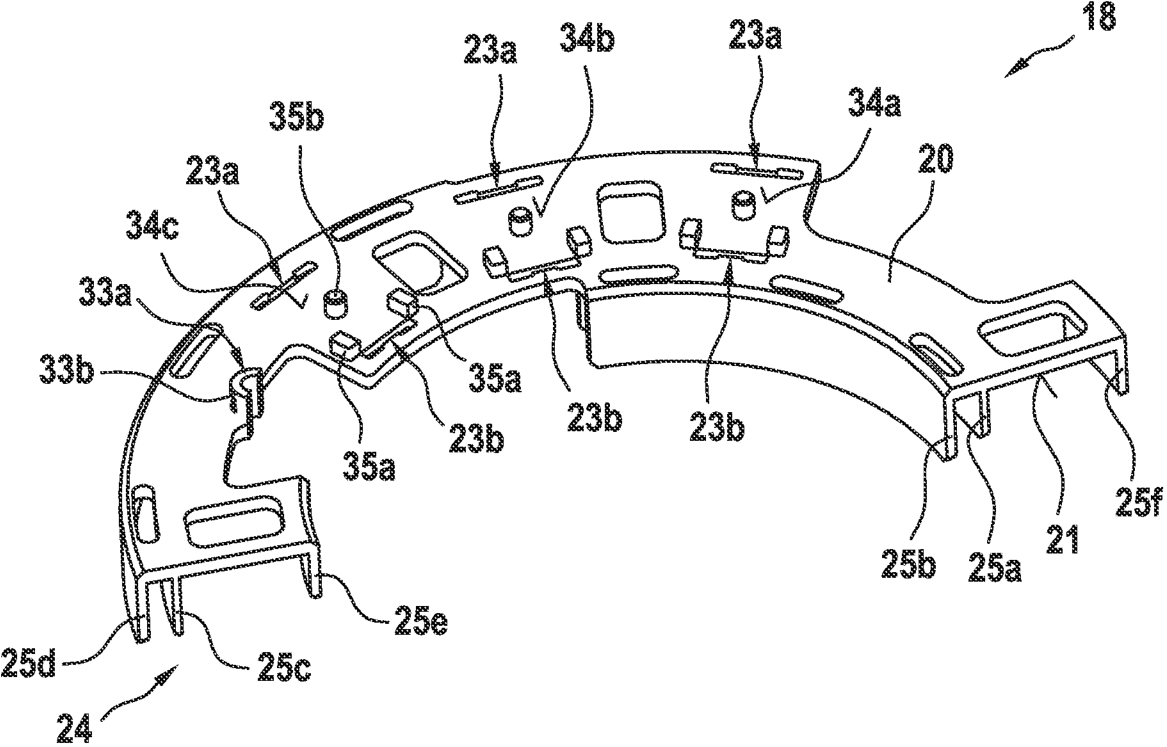
FIG. 9 shows a perspective view of the insulation device.

FIG. 9 is a perspective illustration of the insulation device 18.

The insulation device 18 has a plate-shaped body 20. A first side 21 of the body 20 is designed to extend at least partly over an axial end of the end winding 10 in the circumferential direction. A second side 22 of the body 20 is arranged opposite the first side 21. The terminal elements 17a, 17b, 17c can be arranged on the second side 22.

Moreover, the body 20 has multiple cutouts 23a, 23b, which extend from the first side 21 to the second side 22. The terminals formed by the first end portions 11a to 11d can be routed through the cutouts 23a, 23b from the first side in order to be electrically conductively connected to one of the terminal elements 17a, 17b, 17c on the second side 22. The cutouts 23a here are located on a first arc and the cutouts 23b are located on a second arc, which is arranged concentrically to the first arc and is located radially further inwards than the first arc. The radially outer first end portions 11a, 11b can thus be routed through the radially outer cutouts 23a and the radially inner first end portions 11c, 11 d can be routed through the radially inner cutouts 23b.

Figure 10:
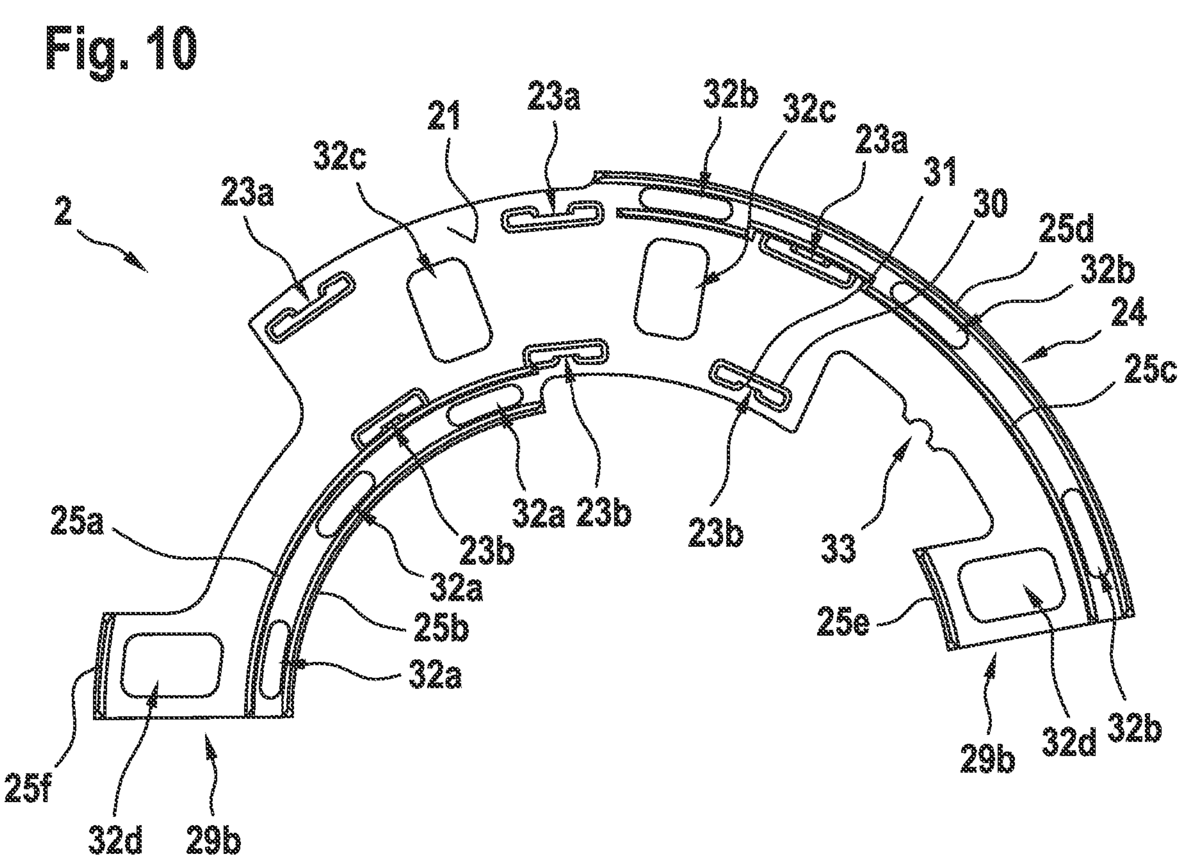
FIG. 10 shows a plan view of a first side of the insulation device.
Figure 11:
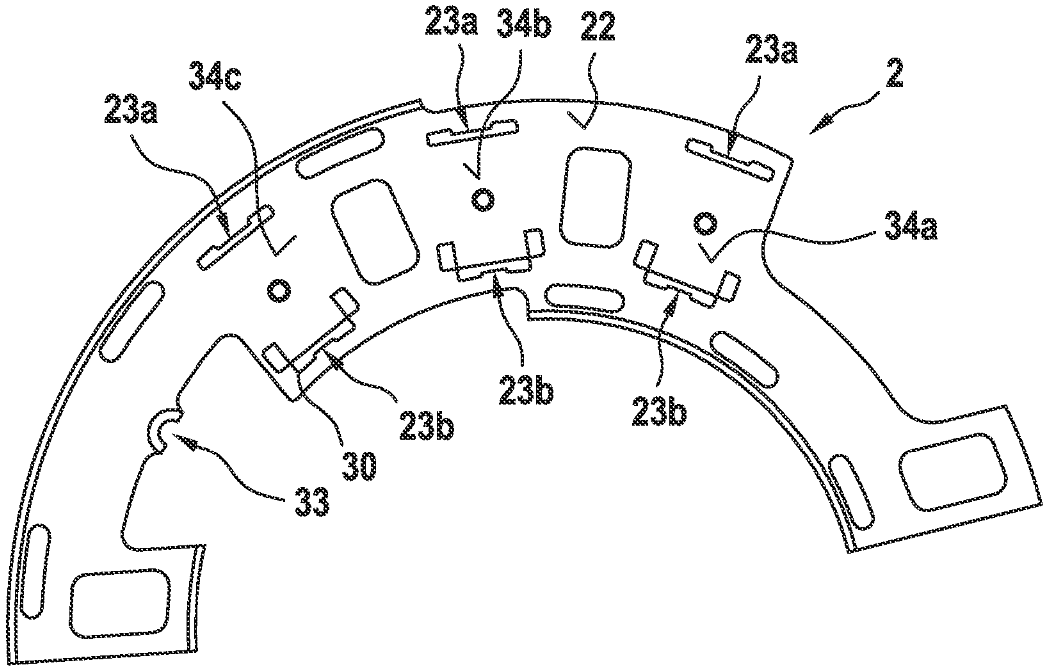
FIG. 11 shows a plan view of the second side of the insulation device.

FIG. 10 and FIG. 11 show the insulation device 18, wherein FIG. 10 is a plan view of the first side 21 and FIG. 11 is a plan view of the second side 22.

The insulation device 18 furthermore has an insulation arrangement 24. The insulation arrangement 24 comprises a first portion 25a, which extends from the first side 21 in a direction pointing away from the second side 22. The first portion 25a surrounds the end winding 10 along its circumference on the radially inner side of the end winding 10.

Moreover, the insulation arrangement 24 has a second portion 25b, which likewise extends from the first side 21 of the body 20 in the direction pointing away from the second side 22. The second portion 25b surrounds the second star-point connection 14b, arranged on the radially inner side of the end winding 10, on the side of the second star-point connection 14*b* which is remote from the end winding 10 so that the first portion 25*a* and the second portion 25*b* surround the second star-point connection 14*b* on both sides.

The insulation arrangement 24 furthermore has a third portion 25*c*, which extends from the first side 21 of the body 20 in the direction pointing away from the second side 22. The third portion 25*c* surrounds the end winding 10 along its circumference on the outer radial side of the end winding 10.

In addition, the insulation arrangement has a fourth portion 25*d*, which extends from the first side 21 of the body 20 in the direction pointing away from the second side 22 of the body 20. The fourth portion 25*d* surrounds the first star-point connection 14*a*, arranged on the radially outer side of the end winding 10, on the side of the first star-point connection 14*a* which is remote from the end winding 10 so that the third portion 25*c* and the fourth portion 25*d* surround the first star-point connection 14*a* on both sides.

In addition, a fifth portion 25*e* and a sixth portion 25*f* are provided, which do not surround the star-point connections 14*a*, 14*b* and which extend on the same arc as the first portion 25*a* and the third portion 25*c*. The fifth portion 25*e* and the sixth portion 25*f* serve for the mechanically stable arrangement of the insulation device 18 on the end winding 10, in addition to the insulation of the end winding 10 with respect to the radial interior and exterior thereof.

The portions 25*a* to 25*f* of the insulation arrangement 24 extend concentrically to each other and have an arcuate design. In the present exemplary embodiment, they are positioned vertically on the body 20.

The first portion 25*a* and the second portion 25*b* and the sixth portion 25*f* are arranged on a first end 29*a* of the body 20. The third portion 25*c*, the fourth portion 25*d* and the fifth portion 25*e* are arranged on a second end 29*b* of the body 20, which is opposite the first end 29*a*.

As is furthermore revealed in FIG. 10 and FIG. 11, each cutout 23*a*, 23*b* has an edge 30 with a projection 31 directed into the cutout 23*a*, 23*b*.

Moreover, the body 20 has three through openings 32*a*, which are arranged in regions in which the first portion 25*a* and the second portion 25*b* extend concentrically to each other. Moreover, three through openings 32*b* are provided in regions of the body 20 in which the third portion 25*c* and the fourth portion 25*d* extend concentrically to each other.

Further through openings 32*c* are provided centrally between respective groups of four of the cutouts 23*a*, 23*b*, of which a first cutout 23*a* and a second cutout 23*a* are located at a first radial position, a third cutout 23*b* and a fourth cutout 23*b* are located at a second radial position, the first cutout 23*a* and the third cutout 23*b* are located at a first angular position in the circumferential direction and the second 23*a* and the fourth cutout 23*b* are located at a second position in the circumferential direction. Moreover, through openings 32*d* are provided in the regions in which the first portion 25*a* and the sixth portion 25*f* and the third portion 25*c* and the fifth portion 25*e* of the insulation arrangement 24 extend concentrically to each other.

In addition, the body 20 has a further cutout 33*a*, in which a sensor 19 of the stator 1 (see FIG. 1), which is arranged on the end winding 10, can be received. On the second side 22, a projection 33*b* (see FIG. 9) for guiding the sensor 13 is formed along an edge contour of the cutout 33*a*.

Moreover, in the insulation device 18, a receiving space 34*a*, 34*b*, 34*c* for a respective terminal element 17*a*, 17*b*, 17*c* is formed on the second side 22 of the body 20. Each receiving space 34*a*, 34*b*, 34*c* is designed to inhibit a movement of the terminal element 17*a*, 17*b*, 17*c* relative to the second side 22 when it is received in the receiving space 34*a*, 34*b*, 34*c*. Each receiving space 34*a*, 34*b*, 34*c* here has two projections 35*a*, 35*b* to inhibit a rotational movement of the terminal element 17*a*, 17*b*, 17*c* about an axis of rotation positioned perpendicular to the second side 22. Additionally, in each receiving space 34*a*, 34*b*, 34*c*, a projection 35*b* is provided to inhibit a translatory movement of the terminal element 17*a*, 17*b*, 17*c* along the second side 22.

The insulation device 2 is made of an electrically insulating material, for example a plastic.

Figure 12:
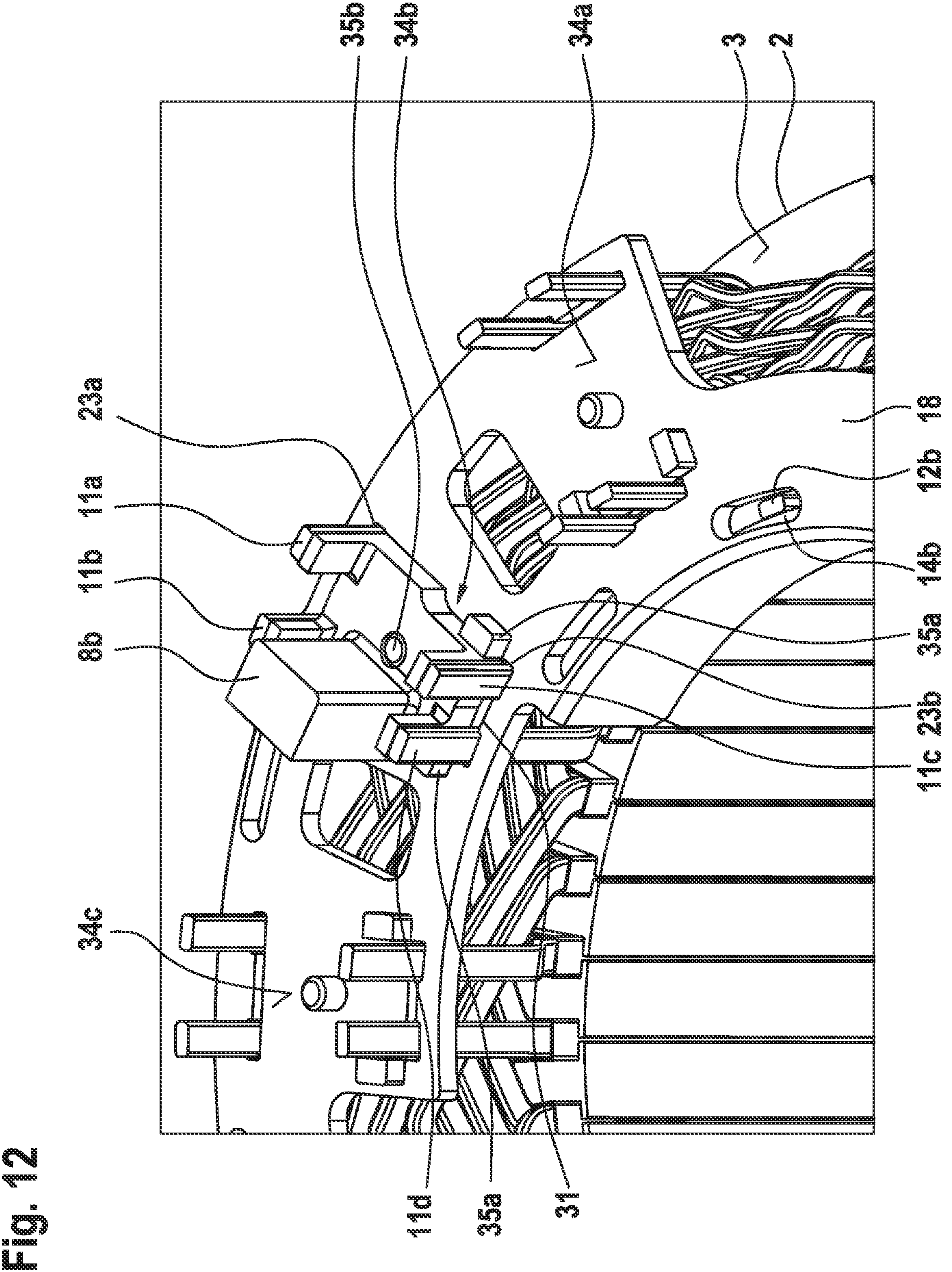
FIG. 12 shows a perspective view of the insulation device when it is arranged on the stator winding.

FIG. 12 is a perspective view of the insulation device 18 when it is arranged on the stator windings 5.

Representatively for the other terminal elements 17*a*, 170, the terminal element 17*b* is received in the receiving space 34*b* here and rotational and translatory movements thereof are impeded by the projections 35*a*, 35*b*. To this end, the projection 35*b* protrudes into a diametrically opposed cutout of the terminal element 17*b*. The first end portions 11*a* to 11*d* pass through the cutouts 23*a*, 23*b*, wherein each cutout 23*a*, 23*b* receives a pair of end portions 11*a* to 11 *d*, which are adjacent in the circumferential direction and are located at the same radial positions. The projections 31, of which one is covered in FIG. 12, hold the end portions 11*a* to 11*d* in their intended position. It can also be seen how the second portion 25*b* of the insulation arrangement 24 surrounds the second star-point connection 14*b* on the radially inner side.

Figure 13:
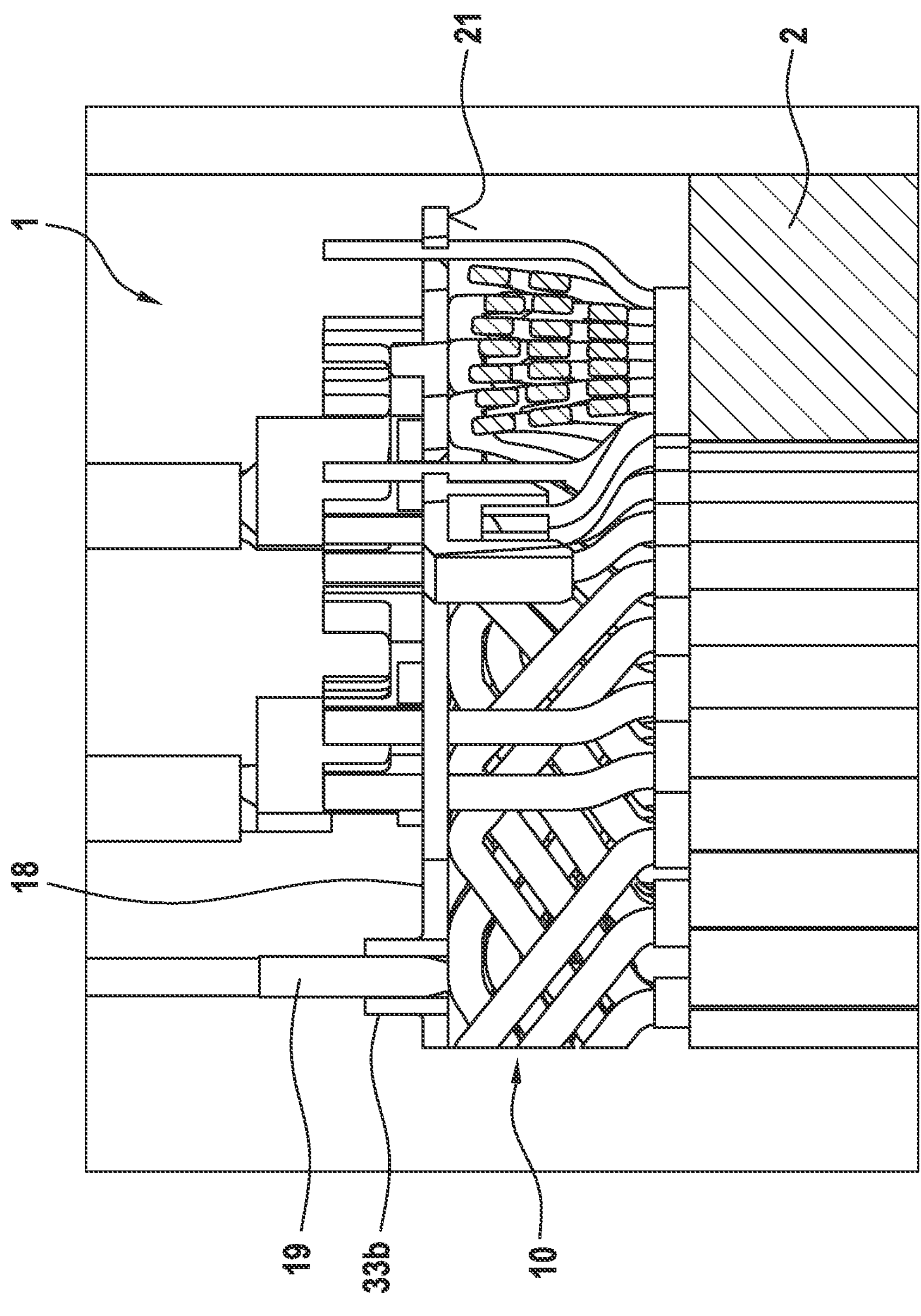
FIG. 13 shows a detailed sectional view of the exemplary embodiment of the stator.

FIG. 13 is a detailed sectional view of the stator 1, in which it can be seen that the insulation device 18 lies on the axial end of the end winding 10 with its first side 21. The sensor 19, which is guided by means of the projection 33*b* in such a way that it is able to record a temperature of the end winding 10, can furthermore be seen.

Figure 14:
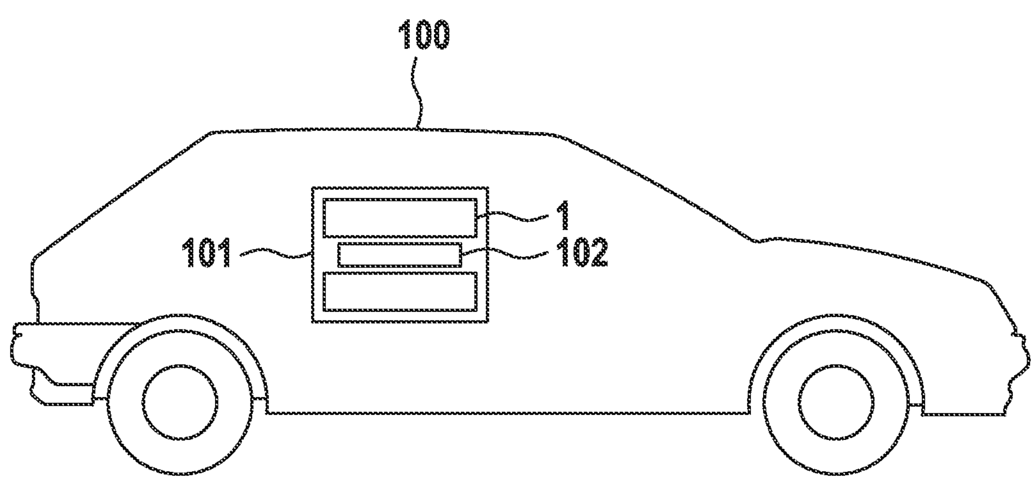
FIG. 14 shows a schematic diagram of a vehicle with an exemplary embodiment of the electric machine according to the invention.

FIG. 14 is a schematic diagram of a vehicle 100 with an exemplary embodiment of an electric machine 101.

The electric machine 101 is designed to drive the vehicle 100 and has a stator 1 according to the previously described exemplary embodiment and a rotor 102, which is rotatably supported inside the stator 1. The electric machine 101 is designed, by way of example, as an asynchronous machine or as a permanently excited synchronous machine. The electric machine 101 forms part of a drive train of the vehicle 100. The vehicle 100 may be a battery electric vehicle (BEV) or a hybrid vehicle.

In an exemplary embodiment, in particular two first end portions 11*a-d* of a phase element, which protrude at the same end face 3, 4 of the stator 1, may be arranged at an inner and an outer radial position of the same angular position in each case. The end portions 11*a-d* may therefore be easily connected in the radial direction. They may form a terminal pair.

In an exemplary embodiment, in particular two first end portions 11*a-d* of a phase element, which protrude at the same end face 3, 4 of the stator 1, may be arranged at an innermost and an outermost radial position of the same angular position in each case. The end portions 11*a-d* may therefore be easily connected in the radial direction. They may form a terminal pair.

In a further exemplary embodiment, two further first end portions 11*a-d* may be arranged adjacent to the two first end portions 11*a-d*. Therefore, two such terminal pairs may be arranged adjacently and connected to form a common terminal. Therefore, for example, four part windings, which form a phase element, may be easily connected, for example to an inverter.

The invention claimed is:

1. A stator for an electric machine, comprising:

a stator core with a first end face and a second end face and having a stator winding, which has multiple part windings and forms a number of phase elements, each part winding including multiple shaped conductors, which extend through the stator core along an axial direction at predetermined angular positions in a circumferential direction, a first end portion, which comprises a free end of the part winding and protrudes from the stator core at the first end face, and a second end portion; and multiple connectors which connect the shaped conductors at the end faces, and, at the first end face, form an end winding which extends inside a radial region, wherein the first end portion protrudes from the stator core at one of the predetermined angular positions and extends in the axial direction at the predetermined angular position, and wherein the second end portion assumes a greater radial spacing from the end winding than the first end portion.

2. The stator according to claim 1, wherein the second end portion of a respective part winding comprises a free end of the part winding and protrudes from the stator core at the first end face or the second end face.

3. The stator according to claim 2, wherein the second end portion of a respective part winding protrudes from the stator core at one of the predetermined angular positions at the end face and extends in the axial direction at the angular position.

4. The stator according to claim 1, wherein the first end portion and/or the second end portion are integrally connected to a respective shaped conductor and is/are formed at the respective predetermined angular position with a parallel offset in the radial direction with respect to the shaped conductor.

5. Stator The stator according to claim 1, wherein a respective part winding has a terminal and a star-point terminal, and the first end portion forms the terminal and the second end portion forms the star-point terminal, or the first end portion forms the star-point terminal and the second end portion forms the terminal.

6. The stator according to claim 5, wherein some of the part windings form an arrangement and those end portions of the part windings of the arrangement which form the star-point terminal extend along the end winding on one radial side of the radial region.

7. The stator according to claim 6, wherein some of the part windings form a second arrangement and those end portions of the part windings of the second arrangement which form the star-point terminal extend along the end winding on the other radial side of the radial region, and/or, for a respective arrangement, a star-point connection, via which the end portions of the arrangement which form the star-point terminal are interconnected, wherein the star-point connection is formed as a curved busbar.

8. The stator according to claim 4, wherein a plurality of slots, which are arranged in the circumferential direction and in which the shaped conductors are received, are formed in the stator core, those end portions of the part windings of a respective phase element which form the terminal protrude from the same slot or from multiple immediately adjacent slots, and the shaped conductors are received in a predetermined number of radially arranged layers of a respective slot in the stator core, wherein those end portions of the part windings of a respective phase element which form the terminal adjoin shaped conductors which are arranged in a radially innermost one of the layers and/or in a radially outermost one of the layers.

9. The stator according to claim 5, further comprising a terminal arrangement, which has a number of terminal elements which corresponds to the number of phase elements, wherein a respective terminal element interconnects those end portions of the part windings of one of the phase elements which form the terminal.

10. The stator according to claim 9, further comprising an insulation device, which is designed for electrical insulation of the end winding with respect to the terminal elements.

11. The stator as claimed in claim 1, wherein the end portion forming the terminal of a respective part winding is longer in the axial direction than the other end portion of the respective part winding.

12. The stator according to claim 5, wherein the two first end portions of a phase element, which protrude at the same end face of the stator, are arranged at the inner and at the outer radial position of the same angular position in each case.

13. The stator according to claim 5, wherein the two first end portions of a phase element, which protrude at the same end face of the stator, are arranged at the innermost and at the outermost radial position of the same angular position in each case.

14. The stator according to claim 12, wherein two further first end portions are arranged adjacent to the two first end portions.

15. The stator according to claim 2, wherein the first end portion and/or the second end portion are integrally connected to a respective shaped conductor and is/are formed at the respective predetermined angular position with a parallel offset in the radial direction with respect to the shaped conductor.

16. The stator according to claim 2, wherein a respective part winding has a terminal and a star-point terminal, and the first end portion forms the terminal and the second end portion forms the star-point terminal, or the first end portion forms the star-point terminal and the second end portion forms the terminal.

17. The stator according to claim 5, wherein a plurality of slots, which are arranged in the circumferential direction and in which the shaped conductors are received, are formed in the stator core, those end portions of the part windings of a respective phase element which form the terminal protrude from the same slot or from multiple immediately adjacent slots, and the shaped conductors are received in a predetermined number of radially arranged layers of a respective slot in the stator core, wherein those end portions of the part windings of a respective phase element which form the terminal adjoin shaped conductors which are arranged in a radially innermost one of the layers and/or in a radially outermost one of the layers.

* * * * *